United States Patent [19]

Morris, deceased

[11] Patent Number: 4,607,084

[45] Date of Patent: Aug. 19, 1986

[54] RADIATION CURABLE ACRYLATED POLYURETHANE OLIGOMER COMPOSITIONS

[75] Inventor: William J. Morris, deceased, late of Louisville, Ky., by Carla L. Morris, executrix

[73] Assignee: Celanese Specialty Resins, Inc., Louisville, Ky.

[21] Appl. No.: 809,450

[22] Filed: Dec. 16, 1985

Related U.S. Application Data

[63] Continuation-in-part of Ser. No. 619,100, Jun. 11, 1984, abandoned.

[51] Int. Cl.$^4$ .............................................. C08L 75/04
[52] U.S. Cl. ...................................... 525/454; 522/90
[58] Field of Search ......................................... 525/454

[56] References Cited

U.S. PATENT DOCUMENTS

| | | | |
|---|---|---|---|
| 3,700,643 | 10/1972 | Smith et al. | 260/77.5 AN |
| 3,782,961 | 1/1974 | Takahashi et al. | 96/115 R |
| 3,929,929 | 12/1975 | Kuehn | 260/859 R |
| 4,057,431 | 11/1977 | Finelli et al. | 96/115 R |
| 4,089,763 | 5/1978 | Dart et al. | 204/159.23 |
| 4,131,602 | 12/1978 | Hodakowski et al. | 528/49 |
| 4,133,723 | 1/1979 | Howard | 204/15 |
| 4,139,436 | 2/1979 | Jasani | 204/159.16 |
| 4,174,307 | 11/1979 | Rowe | 204/159.19 |
| 4,309,526 | 1/1982 | Baccei | 528/75 |
| 4,312,798 | 1/1982 | Kovacs | 260/29.2 TN |
| 4,357,219 | 11/1982 | Sattler | 204/159.15 |
| 4,467,078 | 8/1984 | Kolycheck et al. | 525/455 |

*Primary Examiner*—Maurice J. Welsh
*Attorney, Agent, or Firm*—Herbert P. Price

[57] ABSTRACT

Radiation cured compositions having improved abrasion resistance and cure response are made from blends of the reaction product of a diisocyanate, a hydroxyalkyl acrylate and a polyether diol with the reaction product of a diisocyanate, a hydroxyalkyl acrylate and a polyether triol wherein the average acrylate functionality of the blends is from about 2.4 to about 2.6. Such cured compositions are useful as coatings for various substrates.

22 Claims, No Drawings

RADIATION CURABLE ACRYLATED POLYURETHANE OLIGOMER COMPOSITIONS

CROSS REFERENCE TO RELATED APPLICATIONS

This is a continuation-in-part of Ser. No. 619,100 filed June 11, 1984, now abandoned.

BACKGROUND OF THE INVENTION

The field of art to which this invention pertains is radiation curable acrylated polyurethanes.

Due to environmental concern and the high cost of solvents, commercial interest in radiation curable compositions is constantly increasing. Federal, state and local government legislation which restricts the amount of solvents and other pollutants that can be vented to the atmosphere is one reason for this increased interest. Other reasons are the concerns expressed by unions and individuals over the possible toxic effects of prolonged exposure to volatile organic materials and also the high cost of petroleum derived solvents. Generally, radiation curable systems are essentially 100% reactive systems, i.e., substantially all of the components react to produce the final product. Such systems can be cured by exposure to high energy ionizing radiation or to actinic radiation in the presence of photoinitiators.

Among the various radiation curable compositions disclosed in the prior art are polyurethane oligomers which have terminal acrylyl or methacrylyl groups. These are generally produced by the reaction of one or more organic polyisocyanates with one or more organic polyols wherein at least a portion of the polyisocyanate or polyol reactant has, in addition to its isocyanate or hydroxyl functionality, acrylyl or methacrylyl groups. Such radiation curable polyurethane oligomers can be made by reacting a stoichiometric excess of a polyisocyanate with a polyol and then reacting the remaining isocyanate groups with a hydroxyalkyl acrylate or methacrylate. U.S. Pat. No. 3,700,643 discloses radiation curable oligomers made by reacting a polycaprolactone diol with an organic diisocyanate in a mole ratio of one to two followed by reaction with hydroxyethyl acrylate. In U.S. Pat. No. 3,782,961 a hydroxy compound having at least 5 ether linkages and a terminal acrylate or methacrylate group is reacted with a polyisocyanate.

U.S. Pat. No. 4,133,723 discloses radiation curable compositions made by reacting a polyalkylene polyol having from 2 to 6 hydroxyl groups with a molar excess of a diisocyanate followed by reaction with a hydroxyalkyl acrylate or methacrylate.

U.S. Pat. Nos. 4,057,431 and 4,139,436 describe photopolymerizable compositions made by reacting a polyether polyol having 2 or 3 hydroxyl groups with an organic polyisocyanate and a hydroxyalkyl methacrylate. The reaction can be conducted in a diluent such as a polyethylene polyol acrylate or methacrylate.

Low viscosity radiation curable compositions are described in U.S. Pat. No. 4,131,602. Such compositions are made by reacting an organic diisocyanate with a combination of organic tri/tetraol and organic diol followed by reacting a hydroxyalkyl acrylate. The combination of polyols is either a polyester tri/tetraol-polyether diol or a polyether tri/tetraol-polyester diol.

Additional patents which disclose radiation curable polyurethane oligomers are U.S. Pat. Nos. 3,929,929; 4,089,763; 4,174,307; 4,309,526 and 4,312,798.

Constant efforts are being made to improve the properties of radiation curable compositions. In the radiation curable coatings area, there is a need for compositions which have enhanced cure response, and, after being cured, improved abrasion resistance and improved tensile strength.

SUMMARY OF THE INVENTION

This invention is directed to radiation curable acrylated polyurethane oligomers. In one aspect this invention pertains to acrylated polyurethane oligomers which have enhanced cure response and which, after being cured, have improved abrasion resistance and improved tensile strength. In another aspect this invention relates to a process for improving the abrasion resistance and cure response of radiation cured coating compositions.

The radiation curable compositions of this invention are acrylated polyurethane oligomers which are blends of the reaction product of an organic diisocyanate, a polyether diol and a hydroxyalkyl acrylate or methacrylate and the reaction product of an organic diisocyanate, a polyether triol and a hydroxyalkyl acrylate or methacrylate. The organic diisocyanate is an aliphatic or cycloaliphatic diisocyanate. The polyether diol is a dihydroxy terminated polyalkylene oxide which contains 2 to 4 carbon atoms in each alkylene group and which has a molecular weight of about 800 to about 2000. The polyether triol is a trihydroxy terminated polyalkylene oxide which contains 2 to 3 carbon atoms in each alkylene group and which has a molecular weight of about 300 to about 750. The alkyl group of the hydroxyalkyl acrylate contains 2 to 3 carbon atoms. The reactants are reacted in the following proportions: about one mole of diisocyanate is reacted per hydroxyl group of the polyether diol and polyether triol; about one mole of hydroxyalkyl acrylate or methacrylate is reacted per mole of diisocyanate. The blends contain an average acrylate or methacrylate functionality of about 2.4 to about 2.6.

The radiation curable compositions of this invention can be made by preparing each reaction product, i.e., the reaction product based on the polyether diol and the reaction product based on the polyether triol and then blending the two products. The radiation curable composition can also be prepared by preblending the polyether diol and the polyether triol in a molar ratio of about 0.9:1 to about 1.1:1 and then reacting this blend with the diisocyanate and the hydroxyalkyl acrylate or methacrylate.

DESCRIPTION OF THE INVENTION

The diisocyanates useful in this invention are organic aliphatic or cycloaliphatic diisocyanates which contain two isocyanate groups per molecule and no other groups which are reactive with hydroxyl groups. Examples of such diisocyanates are 1,6-hexamethylene diisocyanate, 1,4-hexamethylene diisocyanate, 2,2,4-trimethyl-hexamethylene diisocyanate, 2,4,4-trimethyl-hexamethylene diisocyanate, 4,4'-methylene-bis(cyclohexylisocyanate), isophorone diisocyanate, 1-methyl-2,4-diisocyanacyclohexane, and the like. The preferred diisocyanates are 4,4'-methylene-bis(cyclohexylisocyanate), isophorone diisocyanate and mixtures thereof.

The polyether diols useful in this invention are dihydroxy terminated polyalkylene oxides having 2 to 4 carbon atoms in each alkylene group. Such polyether diols are made by polymerizing ethylene oxide, propylene oxide, or butylene oxide, or mixtures thereof to form block copolymers, with a dihydric initiator. Such initiators are ethylene glycol, diethylene glycol, 1,2-propylene glycol, 1,4-butanediol, and the like. A preferred polyether diol is made by polymerizing tetrahydrofuran to a polyether diol having 4 carbon atoms in each alkylene group. Useful polyether diols have molecular weights of about 800 to about 2000. A most preferred polyether diol has a molecular weight of about 1000.

The polyether triols useful in this invention are trihydroxyl terminated polyalkylene oxides having 2-3 carbon atoms in each alkylene group. Such polyether triols are made by polymerizing ethylehe oxide, or propylene oxide, or mixtures thereof to form block copolymers, with a trihydric initiator. Such initiators are trimethylol ethane, trimethylol propane, glycerol, 1,2,4-butanetriol and the like. Useful polyether triols have molecular weights of about 300 to about 750. A most preferred polyether diol has a molecular weight of about 440.

The hydroxyalkyl acrylates or methacrylates useful in this invention contain one radiation polymerizable double bond and one aliphatic hydroxyl group. The alkyl group contains 2 or 3 carbon atoms. Such hydroxyalkyl acrylates or methacrylates are hydroxyethyl acrylate, hydroxypropyl acrylate, hydroxyethyl methacrylate and hydroxypropyl methacrylate.

In preparing the compositions of this invention, the components are reacted in such proportions that the equivalents of isocyanate groups are equal to the total hydroxyl groups in the polyols and the hydroxyalkyl acrylate or methacrylate. Specifically, one mole of diisocyanate is reacted for each hydroxyl group of the polyol and one mole of hydroxyalkyl acrylate or methacrylate is reacted for each mole of diisocyanate. The polyether diol and the polyether triol are used in the molar ratios of about 0.9:1 to about 1.1:1. The use of these ratios results in an average acrylate or methacrylate functionality of about 2.4 to about 2.6. The preferred molar ratio of diol to triol is 1:1, with the average functionality being 2.5.

In preparing the compositions of this invention, the reaction product of the diol and the reaction product of the triol can be made separately, followed by blending of the finished products. In an alternate procedure, the diol and triol can be blended together followed by reaction with the diisocyanate and the hydroxyalkyl acrylate or methacrylate.

The components can be reacted in any order. For instance, all of the components, the diisocyanate, the polyols and the hydroxyalkyl ester can be added together and reacted. The reaction can also be conducted stepwise. Preferably, the hydroxyalkyl ester is reacted with the diisocyanate followed by reaction with the polyol.

The reaction conditions forming the acrylated polyurethane oligomers are reactions well known to those skilled in the art. Generally, the reactions are carried out at a temperature of about 30° C. to about 120° C., preferably about 80° C. to about 150° C.

A urethane formation catalyst can be used in these reactions. Such catalysts include dibutyltin dilaurate, dioctyltin diacetate, dibutyltin oxide, stannous oleate, stannous tallate, lead octoate, triethylamine, morpholine, piperazine and the like.

In order to prevent polymerization of the acrylate or methacrylate groups during the reaction, an inhibitor can be added. Such inhibitors include hydroquinone, methyl ether hydroquinone and phenothiazine.

The reaction can be conducted in a solvent or, preferably, in the absence of a solvent. If a solvent is used it can be a chemically inert solvent, such as xylene, toluene, 2-ethoxyethyl acetate and the like. However, if a chemically inert solvent is used, it must be removed from the reaction product when the reaction is completed in order to be able to formulate a 100% reactive curable composition. If a solvent is used the preferred solvents are reactive solvents, i.e., solvents which contain double bonds which are polymerizable by radiation. Examples of such solvents include alkyl acrylates or methacrylates having up to 12 carbon atoms in the alkyl group such as ethyl acrylate, butyl acrylate, 2-ethylhexyl acrylate, lauryl acrylate, methyl methacrylate, octyl methacrylate and the like. Other reactive solvents are alkoxyalkyl acrylates or methacrylates, such as methoxybutyl acrylate, ethoxyethoxyethyl acrylate, ethoxypropyl acrylate, ethoxyethyl methacrylate and the like. Additional reactive solvents include allyl acrylate, phenoxyethyl acrylate, cyclohexyl acrylate, acrylonitrile, cyanoethyl acrylate, 1,6-hexanediol diacrylate, trimethylolpropane triacrylate, acrylated fatty alcohols, acrylated aliphatic diglycidyl ethers and the like. The amount of solvent used is such that the finished product has the desired application viscosity. Generally, the amount of solvent will vary from 0 to about 50 weight percent based on the total weight of oligomer and solvent, and, preferably, about 10 to about 20 weight percent.

The radiation curable compositions of this invention can be cured by any of the known actinic radiation curing methods. The radiation can be ionizing radiation, either particulate or non-particulate or non-ionizing radiation. As a suitable source of particulate radiation, one can use any source which emits electrons or charged nucleii. Particulate radiation can be generated from electron accelerators such as the Vander Graff accelerator, resonance transformers, linear accelerators, insulating core transformers, radioactive elements such as cobalt 60, strontium 90, etc. As a suitable source of non-particulate ionizing radiation, any source which emits radiation in the range of from about $10^{-3}$ angstroms to about 2000 angstroms can be used. Suitable sources are vacuum ultraviolet lamps, such as xenon or krypton arcs. As a suitable source of non-ionizing radiation, any source which emits radiation from about 2000 angstroms to about 4000 angstroms can be used. Suitable sources are mercury arcs, carbon arcs, tungsten filament lamps, sunlamps, lasers and the like. All of these devices and sources are well known in the art and those skilled in radiation technology are fully aware of the manner in which radiation is generated and the precaution to be exercised in its use.

When the radiation curable coating compositions are to be cured by exposure to non-ionizing radiation, e.g., ultraviolet, photoinitiators are added to the composition. Suitable photoinitiators, which are well known in the art, are 2,2-diethoxyacetophenone, 2,3, or 4-bromoacetophenone, benzaldehyde, benzoin, benzophenone, 9,10-dibromoanthracene, 4,4′-dichlorobenzophenone, 2,3-pentanedione, hydroxycyclohexylphenyl ketone, xanthone and the like. Such photoinitiators are added in amounts up to about 10 weight percent based on the weight of the total curable composition, and, preferably, about 1 to about 5 weight percent.

Photoactivators can also be used in combination with the photoinitiators. Examples of such photoactivators are methylamine, tributylamine, n-methyldiethanolamine, 2-aminoethylethanolamine, cyclohexylamine, diphenylamine, tribenzylamine and the like.

The radiation curable compositions of this invention are preferably used as coating compositions. The coatings can be applied by conventional means, including spraying, curtain coating, dip padding, roll coating and brushing procedures. The coatings can be applied to any acceptable substrate, such as wood, metal, glass, fabric, paper, fiber, plastic, etc.

The acrylated polyurethane oligomers can be used with no dilution or can be diluted with active solvents in order to adjust the viscosities of the system for coating applications. Suitable reactive solvents are those referred to hereinbefore. Additional reactive solvents are hydroxyethyl acrylate, hydroxypropyl acrylate, hydroxyethyl methacrylate, hydroxypropyl methacrylate, and the like.

Additional additives include wetting agents, fillers, defoamers, dyes and pigments, the uses of which are well known in the art.

The following examples describe the invention in more detail. Parts and percentages unless otherwise designated are parts and percentages by weight.

EXAMPLE 1

To a suitable reactor were added 528 parts of 4,4'-methylene-bis(cyclohexylisocyanate), 0.87 part of dibutyltin dilaurate and 0.15 part of phenothiazine. Hydroxyethyl acrylate 220 parts, was then added over a 2 hour period. During the first hour and 20 minutes of the addition period, the temperature rose to 123° F. due to the exothermic reaction. Heat was then applied raising the temperature to 154° F. Ten minutes after all the hydroxyethyl acrylate had been added, the addition of 1000 parts of polyoxybutylene glycol having an average molecular weight of 1000 was begun and continued over a 2 hour period with the temperature rising to 190° F. Heating at 190°-210° F. was continued over a 3 hour period.

The resulting product had a viscosity of 10,125 cps at 150° F., #28 Brookfield spindle at 20 RPM, a solids content of 98.9%, a free NCO content of 0.02% and an average functionality of two acrylic groups per molecule.

EXAMPLE 2

To a suitable reactor were added 528 parts of 4,4'-methylene-bis(cyclohexylisocyanate), 0.52 part of dibutyltin dilaurate and 0.2 part of phenothiazine. Hydroxyethyl acrylate, 232 parts, was added over a 2 hour period with the temperature rising to 136° F. Heat was then applied raising the temperature to 150° F. A polyoxypropylene triol based on trimethylolpropane having an average molecular weight of 440, 282 parts, was then added over a one hour period with the temperature rising to 175° F. The temperature was then raised to 195° F. and was held at 195° F. to 198° F. for 3 hours. After this heating period the NCO content was 0.97%. After additional heating at 200° F. for about 8 hours, the NCO content was reduced to 0.03%.

The resulting product had a viscosity of 112,400 cps at 200° F., #28 Brookfield spindle at 2.5 RPM, a solids content of 95.8% and an average functionality of three acrylic groups per molecule.

EXAMPLE 3

To a suitable reactor were added 449 parts of isophorone diisocyanate, 0.5 part of dibutyltin dilaurate and 0.3 part of phenothiazine. Hydroxypropyl acrylate, 263 parts, was then added over a 2 hour period with the temperature rising to 128° F. Heat was then applied raising the temperature to 155° F. A polyoxypropylene triol based on, trimethylolpropane having an average molecular weight of 440, 286 parts, was added over a one hour period with the temperature rising to 190° F. Heating at 195°-200° F. was continued for 7 hours and 15 minutes.

The resulting product had a viscosity of 19,250 cps at 200° F., #28 spindle at 10 RPM, a solids content of 100%, an NCO content of 0.2% and an average functionality of three acrylic groups per molecule.

EXAMPLE 4

To a suitable reactor were added 568 parts of 4,4'-methylene-bis(cyclohexylisocyanate), 477 parts of isophorone diisocyanate, 1.4 parts of dibutyltin dilaurate and 0.84 part of phenotriazine. Hydroxypropyl acrylate, 559 parts, was then added over a 2 hour period with the temperature rising to 157° F. After one hour heating at 146°-155° F., addition of a mixture of 831 parts of the polyoxybutylene glycol having a molecular weight of 1000 and 364 parts of a polyoxypropylene triol based on trimethylolpropane having an average molecular weight of 440 was begun and continued for 2 hours with the temperature rising to 206° F. After about 8 hours heating at 200° F., the NCO content was 0.05%.

The resulting product had a viscosity of 3,890 cps at 200° F., #28 spindle at 50 RPM, a solids content of 100% and an average acrylic functionality of 2.5 acrylic groups per molecule.

EXAMPLE 5

Using the same procedure described in the preceding examples, 987 parts of isophorone diisocyanate were reacted with 578 parts of hydroxypropyl acrylate followed by reaction with a mixture of 859 parts of the polyoxybutylene glycol, average molecular weight 1000, and 376 parts of the polyoxypropylene triol based on trimethylolpropane, average molecular weight 440.

The resulting product has a viscosity of 2,195 cps at 200° F., #28 spindle at 100 RPM, a solids content of 100%, an NCO content of 0.09% and an average functionality of 2.5 acrylic groups per molecule.

EXAMPLE 6

Using the same procedure described in the preceding examples, 1100 parts of 4,4'-methylene-bis(cyclohexylisocyanate) were reacted with 542 parts of hydroxypropyl acrylate followed by reaction with a mixture of 805 parts of the polyoxybutylene diol, average molecular weight 1000, and 353 parts of the polyoxypropylene triol based on trimethylolpropane, average molecular weight 440.

The resulting product had a viscosity of 6,950 cps at 200° F., #28 spindle at 50 RPM, a solids content of 100%, an NCO content of 0.04% and an average functionality of 2.5 acrylic groups per molecule.

EXAMPLE 7

To a suitable reactor were added 1100 parts of 4,4'-methylene-bis(cyclohexylisocyanate), 1.4 parts of dibutyltin dilaurate and 0.84 part of phenothiazine. After thorough mixing, 311 parts of ethoxyethoxyethyl acrylate were added. The temperature was adjusted to 75° F. and addition of hydroxypropylacrylate, 542 parts, was begun. The addition was completed after 2 hours with the temperature rising to 148° F. After holding at a temperature of 148°-150° F. for 1 hour, the addition of a mixture of 805 parts of polyoxybutylene glycol, average molecular weight 1000, and 353 parts of polyoxypropylene triol based on trimethylolpropane, average molecular weight 440, was begun. This addition was completed in 1 hour and 2 minutes with the temperature rising to 190° F. Heating at 190°-202° F. was continued over a 7 and one-half hour period.

The resulting product had a viscosity of 8,080 cps at 150° F., #28 spindle at 20 RPM, an NCO content of 0.13% and an average acrylate functionality based on the diol and triol of 2.5 acrylic groups per molecule.

EXAMPLE 8

A radiation curable composition was made by mixing together 55.6 parts of the product of Example 7, 30 parts of trimethylolpropane triacrylate, 14.4 parts of N-vinyl pyrrolidone and 2 parts of hydroxycyclohexylphenyl ketone (Irgacure 184 obtained from Ciba-Geigy Corporation, Additives Dept.). Films were prepared on filled particle board at 0.5 mil thickness and were cured at a line speed of 50 feet per minute with a Fusion Ultraviolet Curing Unit, Model F-440, Fusion Systems Corporation, Rockville, Maryland with two 300 watt per linear inch mercury vapor lamps. The films after being cured exhibited 100% adhesion to the substrate, had a methylethyl ketone (MEK) resistance of greater than 200 double rubs, a pencil hardness of 8H and Taber abrasion resistance of 1.25 mg. weight loss.

Adhesion of the cured coatings to the substrate was determined as follows: the coatings were cross-hatched with scratch lines so as to form 100 squares. The cross-hatched area was covered with 3M Company 610 Scotch Cellophane tape and even pressure was applied to the tape so that it would adhere evenly to the coating. The tape was then pulled from the coating and the % adhesion was determined by counting the squares which were removed by the tape.

Taber abrasion resistance was determined on a Taber Abraser, Model E-4010, using CS-17 wheels with a 1000 gram load. The abrasion resistance is reported as the milligrams of coating lost during the abrasion test after 1000 cycles.

EXAMPLE 9

A number of radiation curable compositions were prepared by blending the various components as listed in the following table:

| Component | 9A | 9B | 9C | 9D | 9E | 9F | 9G | 9H | 9I | 9J | 9K | 9L |
|---|---|---|---|---|---|---|---|---|---|---|---|---|
| Example 1 | 45 | | | | | 22.5 | 18 | 13.5 | 9 | 27 | 31.5 | 36 |
| Example 2 | | 45 | | | | 22.5 | 27 | 31.5 | 36 | 18 | 13.5 | 9 |
| Example 7 | | | 50 | | | | o | | | | | |
| Ebecryl 264* | | | | 50 | 50 | | | | | | | |
| EOEOEA** | 5 | 5 | | | 5 | 5 | 5 | 5 | 5 | 5 | 5 | 5 |
| NVP*** | 20 | 20 | 20 | 20 | 20 | 20 | 20 | 20 | 20 | 20 | 20 | 20 |
| TMPTA**** | 30 | 30 | 30 | 30 | 25 | 30 | 30 | 30 | 30 | 30 | 30 | 30 |
| Irgacure 187 | 2 | 2 | 2 | 2 | 2 | 2 | 2 | 2 | 2 | 2 | 2 | 2 |

*Aliphatic urethane acrylate obtained from UCB, Societe Anonyme, Belgium
**Ethoxyethoxyethyl acrylate
***N—Vinyl pyrrolidone
****Trimethylolpropane triacrylate Coatings were prepared on filled particle board at 0.5 mil thickness and were cured in the curing unit described in Example 8. Cure speed is reported as feet per minute per double lamp (F/M/dl) and is the maximum speed at which a tack-free film is obtained. Abrasion resistance is reported as milligrams of film lost using the test method described in Example 8. Acrylate functionality is the average functionality per molecule.

| Example | Cure Speed F/M/dl | Abrasion Resistance mg. wt. loss | Acrylate Functionality |
|---|---|---|---|
| 9A | 50 | 43.5 | 2 |
| 9B | 75 | 27.8 | 3 |
| 9C | 125 | 12.4 | 2.5 |
| 9D | 12.5 | 23.2 | 3 |
| 9E | 12.5 | 24.3 | 3 |
| 9F | 100 | 14.3 | 2.5 |
| 9G | 100 | 21.9 | 2.6 |
| 9H | 100 | 23.1 | 2.7 |
| 9I | 100 | 26.6 | 2.8 |
| 9J | 100 | 25.1 | 2.4 |
| 9K | 100 | 29.7 | 2.3 |
| 9L | 100 | 31.0 | 2.2 |

As can be seen from the abrasion resistance results listed above, the minimum weight loss was obtained when the acrylate functionality per molecule was 2.5.

EXAMPLE 10

Radiation curable coatings were prepared by blending various components in the proportions listed in the following table. Coatings were prepared on filled particle board and were cured and tested using the procedures described in the Examples 8 and 9.

| | Examples | | |
|---|---|---|---|
| | 10A | 10B | 10C |
| Components | | | |
| Example 6 | 50 | | |
| Example 5 | | 50 | |
| Example 4 | | | 50 |
| TMPTA | 30 | 30 | 30 |
| NVP | 20 | 20 | 20 |
| Irgacure 184 | 2 | 2 | 2 |
| Properties | | | |
| Cure Speed F/M/dl | 60 | 60 | 60 |
| Abrasion Resistance mg. wt. loss | 13.7 | 19.3 | 19.2 |

-continued

|  | Examples | | |
|---|---|---|---|
|  | 10A | 10B | 10C |
| Acrylate Functionality | 2.5 | 2.5 | 2.5 |

EXAMPLE 11

Radiation curable coating compositions were prepared by blending the acrylated urethane of Example 7 with trimethylpropane triacrylate, the dimethacrylate of polyethylene glycol (M.W. 600) (DAPEG), n-vinyl pyrrolidone and Irgacure 184 in the following proportions:

|  | Example | |
|---|---|---|
| Components | 11A | 11B |
| Example 7 | 50 | 50 |
| TMPTA | 30 | 30 |
| DAPEG | 20 | 10 |
| NVP |  | 10 |
| Irgacure 184 | 2 | 2 |

Coatings were prepared on filled particle board and were cured as described in Example 9. The abrasion resistance for 11A was 33.9 mg. weight loss and for 11B it was 41.0 mg. weight loss.

EXAMPLE 12

Radiation curable coatings were prepared by blending various components in the proportions listed below. Coatings were prepared on filled particle board and were cured and tested using the procedures described in Examples 8 and 9.

|  | Examples | | |
|---|---|---|---|
|  | 11A | 11B | 11C |
| Components |  |  |  |
| Example 3 | 15 | 25 | 50 |
| Example 1 | 85 | 75 | 50 |
| TMPTA | 30 | 30 | 30 |
| NVP | 20 | 20 | 20 |
| Irgacure 184 | 2 | 2 | 2 |
| Properties |  |  |  |
| Abrasion Resistance mg. wt. loss | 20.3 | 29.7 | 16.8 |
| Acrylate Functionality | 2.15 | 2.25 | 2.5 |

EXAMPLE 13

Radiation curable coatings were prepared by blending a trifunctional acrylic urethane based on an aliphatic diisocyanate, Example 3 product, with a difunctional acrylic urethane based on an aromatic diisocyanate. This difunctional acrylic urethane, identified below as TDI, was made using the procedure described in Example 1 wherein toluene diisocyanate was substituted on an equivalent basis for 4,4'-methylene-bis(cyclohexylisocyanate).

|  | Examples | | |
|---|---|---|---|
|  | 13A | 13B | 13C |
| Components |  |  |  |
| Example 3 | 50 | 25 | 15 |
| TDI | 50 | 75 | 85 |
| TMPTA | 30 | 30 | 30 |
| NVP | 20 | 20 | 20 |
| Irgacure 184 | 2 | 2 | 2 |
| Properties |  |  |  |
| Abrasion Resistance mg. wt. loss | 42.2 | 51.1 | 66.2 |
| Acrylate Functionality | 2.5 | 2.25 | 2.15 |

In this example, the best abrasion resistance is found with the blend having an acrylate functionality of 2.5 as was shown in the preceding examples. However, if the results of this example are compared with those of Example 12, it can be seen that much better abrasion resistance is obtained when all of the isocyanate in the urethane is aliphatic rather than aromatic.

EXAMPLE 14

Using the procedure described in Example 7, an acrylated urethane having an average acrylate functionality of 2.5 was prepared using a triol based on a polyester rather than a polyether. This triol was NIAX PCP 0310, Polycaprolactone supplied by Union Carbide. This acrylate urethane was formulated into a radiation curable coating and was compared with the product of Example 7 formulated in the same manner.

|  | Examples | |
|---|---|---|
|  | 14A | 14B |
| Components |  |  |
| Example 7 | 50 |  |
| Example 14 |  | 50 |
| TMPTA | 30 | 30 |
| NVP | 20 | 20 |
| Irgacure 184 | 3 | 3 |
| Properties |  |  |
| Cure Speed, F/M/dl | 125 | 60 |
| Adhesion to Oak Board | 100% | 98% |
| Adhesion to Panel Board | 100% | 100% |
| MEK Resistance, Double Rubs | >200 | >200 |
| Abrasion Resistance, mg. wt. loss | 11.4 | 15.3 |

EXAMPLE 15

A number of acrylated urethanes were formulated and cured using the procedure described in Example 8. The tensile strength and elongation of the cured compositions were determined with a Universal Testing Unit, Instron Corporation, Canton, Mass., operating at 50% per minute strain rate (1 inch per minute with an initial gap separation of 2 inches).

| Composition | Tensile Strength psi | Elongation % |
|---|---|---|
| Example 7 | 2800 | 22 |
| Example 1 | 385 | 33 |
| CMD 6700[1] | 617 | 36 |
| Uvithane 893[2] | 399 | 22.6 |
| Uvithane 783[3] | 472 | 28 |
| Uvithane 782[4] | 40 | 65 |
| Ebecryl 264[5] | 2430 | 35 |

[1] Aromatic Urethane Acrylate supplied by Celanese Specialty Resins, a Division of Celanese Corporation
[2] Aliphatic Urethane Acrylate supplied by Thiokol Specialty Chemicals Division
[3] Aromatic Urethane Acrylate supplied by Thiokol Specialty Chemicals Division
[4] Aromatic Urethane Acrylate supplied by Thiokol Specialty Chemicals Division
[5] Aliphatic Urethane Acrylate supplied by UCB, Societe Anonyme The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A radiation curable composition which comprises acrylated polyurethane oligomers which are the reaction product of
   (a) an organic diisocyanate,
   (b) a polyether diol, and
   (c) a hydroxyalkyl acrylate or methacrylate blended with the reaction product of
   (d) an organic diisocyanate,
   (e) a polyether triol, and
   (f) a hydroxyalkyl acrylate or methacrylate
   wherein the organic diisocyanate, (a) and (d), is an aliphatic or cycloaliphatic diisocyanate; wherein the polyether diol, (b), is a dihydroxy terminated polyalkylene oxide which contains 2 to 4 carbon atoms in each alkylene group and which has a molecular weight of about 800 to about 2000; wherein the polyether triol, (e), is a trihydroxy terminated polyalkylene oxide which contains 2 to 3 carbon atoms in each alkylene group and which has a molecular weight of about 300 to about 750; wherein the alkyl group of the hydroxyalkyl acrylate or methacrylate contains 2 or 3 carbon atoms; wherein (b) and (e) are in such molar ratios that the resultant composition has an average acrylate or methacrylate functionality of about 2.4 to about 2.6; wherein 1 mole of diisocyanate is reacted per hydroxyl group of the polyether diol and triol; and wherein 1 mole of hydroxyalkyl acrylate or methacrylate is reacted per mole of diisocyanate.

2. The composition of claim 1 wherein the polyether diol and the polyether triol are preblended in a molar ratio of 0.9:1 to 1.1:1 and the reactions of the diisocyanate and the hydroxyalkyl acrylate or methacrylate are conducted with the blend.

3. The composition of claim 1 wherein the average acrylate or methacrylate functionality is 2.5.

4. The composition of claim 2 wherein the polyether diol and the polyether triol are preblended in a molar ratio of 1:1.

5. The composition of claim 1 wherein the diisocyanate is 4,4'-methylene-bis(cyclohexylisocyanate).

6. The composition of claim 1 wherein the diisocyanate is isophorone diisocyanate.

7. The composition of claim 1 wherein the polyether diol is a dihydroxy terminated polyalkylene oxide which contains 4 carbon atoms in each alkylene group.

8. The composition of claim 7 wherein the polyether diol is derived from tetrahydrofuran.

9. The composition of claim 1 wherein the polyether triol has a molecular weight of about 400 and the polyether diol has a molecular weight of about 1000.

10. The composition of claim 1 wherein the hydroxyalkyl acrylate is hydroxyethyl acrylate.

11. The composition of claim 1 wherein the hydroxyalkyl acrylate is hydroxypropyl acrylate.

12. A method for providing improved abrasion resistance and cure response to radiation cured compositions which comprises using as the radiation curable composition the reaction product of
    (a) an organic diisocyanate,
    (b) a polyether diol, and
    (c) a hydroxyalkyl acrylate or methacrylate blended with the reaction product of
    (d) an organic diisocyanate,
    (e) a polyether triol, and
    (f) a hydroxyalkyl acrylate or methacrylate
    wherein the organic diisocyanate, (a) and (d), is an aliphatic or cycloaliphatic diisocyanate; wherein the polyether diol, (b), is a dihydroxy terminated polyalkylene oxide which contains 2 to 4 carbon atoms in each alkylene group and which has a molecular weight of about 800 to about 2000; wherein the polyether triol, (e), is a trihydroxy terminated polyalkylene oxide which contains 2 to 3 carbon atoms in each alkylene group and which has a molecular weight of about 300 to about 750; wherein the alkyl group of the hydroxyalkyl acrylate or methacrylate contains 2 or 3 carbon atoms; wherein (b) and (e) are in such molar ratios that the resultant composition has an average acrylate or methacrylate functionality of about 2.4 to about 2.6; wherein 1 mole of diisocyanate is reacted per hydroxyl group of the polyether diol and triol; and wherein 1 mole of hydroxyalkyl acrylate or methacrylate is reacted per mole of diisocyanate.

13. The method of claim 12 wherein the polyether diol and the polyether triol are preblended in a molar ratio of 0.9:1 to 1.1:1 and the reactions of the diisocyanate and the hydroxyalkyl acrylate or methacrylate are conducted with the blend.

14. The method of claim 12 wherein the average acrylate or methacrylate functionality is 2.5.

15. The method of claim 13 wherein the polyether diol and the polyether triol are preblended in a molar ratio of 1:1.

16. The method of claim 12 wherein the diisocyanate is 4,4'-methylene-bis(cyclohexylisocyanate).

17. The method of claim 12 wherein the diisocyanate is isophorone diisocyanate.

18. The method claim 12 wherein the polyether diol is a dihydroxy terminated polyalkylene oxide which contains 4 carbon atoms in each alkylene group.

19. The method of claim 18 wherein the polyether diol is derived from tetrahydrofuran.

20. The method of claim 12 wherein the polyether triol has a molecular weight of about 400 and the polyether diol has a molecular weight of about 1000.

21. The method of claim 12 wherein the hydroxyalkyl acrylate is hydroxyethyl acrylate.

22. The method of claim 12 wherein the hydroxyalkyl acrylate is hydroxypropyl acrylate.

* * * * *